United States Patent Office 3,008,935
Patented Nov. 14, 1961

3,008,935
PROCESS FOR PREPARING INTERPOLYESTERS OF BIBENZOIC ACID, AN ALIPHATIC DICARBOXYLIC ACID AND A GLYCOL, AND SHAPED ARTICLES THEREOF
Edward A. Wielicki, Philadelphia, and Robert D. Evans, West Chester, Pa., assignors to American Viscose Corporation, Philadelphia, Pa., a corporation of Delaware
No Drawing. Filed July 28, 1958, Ser. No. 751,172
5 Claims. (Cl. 260—75)

This invention relates to new and useful interpolyesters, shaped articles prepared therefrom and methods of preparing the same. More particularly it is directed to unique interpolyesters of bibenzoic acid, an aliphatic glycol and an aliphatic dicarboxylic acid. This invention relates further to films, fibers, molded products, coatings and other shaped articles prepared from the unique interpolyesters described above.

The history of polyesters is a relatively short but active one. Condensation polyesters, while encountered in early researches such as those of Lourenco, Bischoff, Fischer, etc., were not intensively studied until 1928, when Carothers and coworkers began a systematic study of condensation polymerization. Illustrative of Carothers' work is U.S. Patent No. 2,071,250 (1937), which discusses some of the previous work in the field and some of the problems in drawing polyesters into fibers. Carothers produced filaments from his polyesters, but they were low-melting and lacked hydrolytic stability.

The current prior art describes various linear condensation polyesters derived from dihydroxy compounds and dibasic acids, such as terephthalic acid, which are capable of being drawn into fibers showing, by characteristic X-ray patterns, orientation along the fiber axis. However, in using a single glycol and single acid to prepare a polyester, one is limited to a fixed crystal structure and melting point since the constitution of the polymer cannot be varied.

In recent years a limited amount of work has been done involving bibenzoic acid and its esters in connection with homopolyesters. The prior art indicates, however, that this work was not generally fruitful, for a homopolyester of bibenzoic acid and a glycol (e.g. polyethylene-bibenzoate) possesses an extremely high melting point making its use in shaped articles entirely impractical, particularly when attempts were made to use it as a film or fiber-forming material. Moreover, and possibly more important, known polybibenzoates exhibit an extremely high rate of crystallization, making orientation of fibers or films therefrom extremely difficult and costly, if not impossible, from a commercial standpoint.

This invention overcomes these limitations in providing as one of its objects new and useful highly polymeric interpolyesters of an aliphatic glycol, bibenzoic acid and a straight or branched chain aliphatic dicarboxylic acid having valuable properties, including those of being capable of being formed into useful filaments, films, and the like. It is a further object of this invention to provide unique interpolyesters as described above which possess melting points and rates of crystallization which make them amenable to the preparation of new and useful fibers, films, molded products, coatings, other shaped articles and the like. A still further object is the provision of unique interpolyesters having a low degree of solubility in organic solvents. A further object is the provision of new and useful synthetic filaments and films possessing improved moisture regain characteristics. Another object is the provision of new and useful synthetic fibers, film and molded objects having improved dyeing characteristics. A still further object is the provision of a new process for making the unique interpolyesters of this invention. Other objects will appear hereinafter.

The synthetic products according to the present invention are difficultly soluble, usually crystallizable, orientable, highly polymerized interpolyesters of (1) bibenzoic acid, having the general formula:

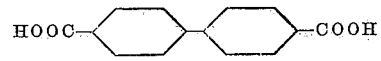

(2) an aliphatic dibasic acid having the general formula:

HOOC—R—COOH wherein R is a bivalent straight or branched chain saturated aliphatic hydrocarbon radical containing 1 to 12 carbons, and (3) a glycol or dihydric alcohol having the general formula:

HO—R—OH wherein R is a straight or branched chain aliphatic hydrocarbon radical containing 2 to 20 carbon atoms.

The polyesters of the present invention possess, among others, the following superior fiber and film properties: (1) controlled melting points over a relatively wide range, i.e. above 140° C. and preferably 200°–270° C., (2) toughness, (3) controlled crystallizability dependent upon thermal and orienting treatment, (4) orientability, (5) pliability, and (6) lack of color. Items (1) and (3) are important in order that the fiber or film have good thermal and dimensional stability, as well as orientability, under a variety of conditions. The advantages of toughness, pliability and lack of color are readily apparent. In order that these latter characteristics be attained, the fiber or film forming polymer must not crystallize too rapidly; otherwise it will not be possible to properly orient it. In other words, it must be capable of being easily converted to an amorphous form which can be oriented by cold or hot drawing or other known orienting procedures. On the other hand, the fiber or film-forming polymer must have latent ability to crystallize, for if it does not it is then brittle toward impact and possesses poor dimensional stability.

In preparing the unique interpolyesters of this invention bibenzoic acid, or a diester or acid chloride thereof, is reacted with the aliphatic dicarboxylic acid described above, or a diester or acid chloride thereof, and one of glycols described above. An ester interchange reaction is generally preferred, since the time required to form the interpolyesters of this invention is generally considerably less, and/or side reactions can generally be minimized to a greater degree than when the free dicarboxylic acids are employed.

The ester interchange method for preparing the interpolyesters of this invention proceeds in three stages:

I. One mole of a mixture of a diester of bibenzoic acid and a diester of one of the saturated aliphatic dicarboxylic acids described above is reacted in the presence of heat and an ester interchange catalyst with at least two moles of a glycol and a monohydric alcohol is distilled off;

II. The temperature is gradually raised to bring about polymerization and excess glycol is distilled off; and III. Polymerization is driven to completion by gradually reducing the pressure to remove the last traces of glycol.

The overall process is illustrated by the following equations:

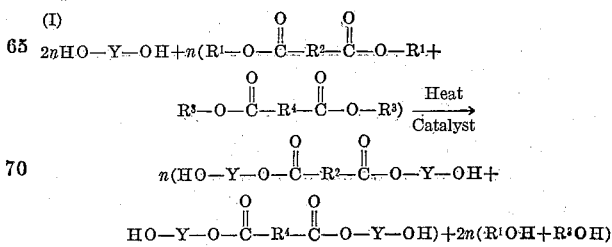

(II and III)

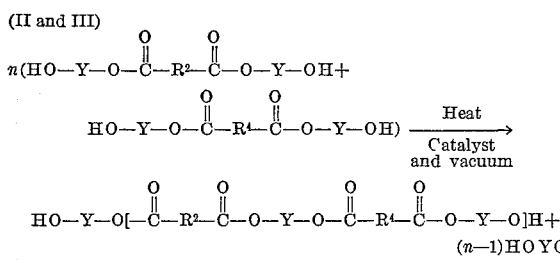

wherein Y is a bivalent aliphatic hydrocarbon radical as described in (3) above; $R^1$ and $R^3$ are same or different hydrocarbon radicals derived from a straight or branched chain aliphatic primary or secondary monohydric alcohol boiling within the range from about 64° to 215° C.; $R^2$ is hydrocarbon residue of bibenzoic acid and $R^4$ is the hydrocarbon residue of one of the aliphatic dicarboxylic acids described above in (2).

In a preferred embodiment of this invention, the mixture of monomeric diesters described above (in a ratio of about 75 to 95 weight percent of a bibenzoate and about 25 to 5 weight percent of an aliphatic dicarboxylate) and a glycol are weighed into a vessel, the ester interchange catalyst added, and a boiling chip introduced. Stage I ester interchange is then carried out at atmospheric pressure under nitrogen at a temperature between about 150° and 225° C. (preferably 175° to 200° C.) for about 2 to 10 hours, distilling off monohydric alcohol. Polymerization is then brought about in stage II by raising the temperature gradually to between about 200° and 400° C. (preferably about 260° to 290° C.) over a period of about ½ to 2 hours, continuing polymerization for a period of about ½ to 3 hours at this temperature and distilling off excess glycol. In stage III pressure is gradually reduced to below about 5 mm. (preferably 0.2 to 0.5) over a period of about ½ to 4 hours (preferably about 1 to 2 hours), followed by continued heating at this elevated temperature and reduced pressure for a period of about 2 to 10 hours. In this latter step the last traces of the glycol are distilled off and the reaction mixture becomes progressively more viscous.

The specific temperatures and heating periods may vary over wider ranges than those outlined above depending on the observed rate of reaction. In cases where reaction becomes sluggish, higher temperature and/or longer periods of time will be employed. In those cases where the polymer is solidified, or begins to solidify before it is apparent all glycol has been removed, the temperature and/or the heating period are increased. The conditions can be varied considerably depending upon the degree of the polyesterification desired, the ultimate properties sought, stability of the polyester being produced and use for which the product is intended. When the desired viscosity is reached under these conditions in stage III, evacuation and heating are discontinued, an inert gas admitted, the vessel allowed to cool to approximately room temperature and the polyester removed.

In theory a total of only one mole of one of the glycols is necessary to effect complete polyesterification with one mole of the mixed monomeric diesters described herein; however, in practice, it is difficult to attain complete reaction under these conditions. It is therefore usually necessary to utilize an excess of the glycol, preferably at least two moles of glycol to one mole of mixed monomer diesters. Quantities substantially larger than about 2 moles of the glycol may be used; however, since they are not necessary, in the interests of economy, they are not recommended.

Examples of some of the various monomeric diesters which can be employed in accordance with the process of the invention include those derived from bibenzoic acid, one of the aliphatic acids of this invention and one of the following primary monohydric alcohols: methanol, ethanol, propanol-1, 2-methyl-propanol-1, butanol-1, 2-methyl-butanol-4, 2,2-dimethyl propanol-1, pentanol-1, 2-methyl-pentanol-1, 2-methyl-pentanol-5, 3-methylol-pentane, hexanol-1, 2-methyl-hexanol-1, 2-methyl-hexanol-6, heptanol-1, 2-ethyl-hexanol-1, octanol-1, nonanol-1, 2,6-dimethyl-3-methylol-heptane. Diesters derived from these same acids and secondary monohydric alcohols can be utilized also, e.g. propanol-2, butanol-2, 2-methyl-butanol-3, pentanol-2, pentanol-3, 2-methyl-pentanol-3, 3-methyl-pentanol-2, hexanol-2, 2,2-dimethyl-butanol-3, 2-methyl-hexanol-3, heptanol-4, octanol-2, decanol-4.

Since in the preferred process, the alcohols from which the diesters are derived are removed from the reaction zone by boiling, it is generally necessary to utilize a glycol having a boiling point higher than that of the alcohol being evolved. Examples of some of the glycols described in (3) above are as follows: Ethylene, trimethylene, tetramethylene, pentamethylene, hexamethylene, decamethylene glycols, 2,2-dimethyl-1, 3-propanediol, 2,2,-3,3-tetramethyl-1, 4-butanediol, 2-buten-1,4-diol, 2-hexen-1,6 diol, 3-octen-1,8-diol, 2,2,5,5-tetramethyl-3-hexene-1,6-diol, etc.

Examples of some of the aliphatic dicarboxylic acids suitable for the purposes of this invention include malonic, succinic, glutaric, adipic, pimelic, suberic, azelaic, undecandioic, (1,9-nonane-dicarboxylic acid), dodecandioic (1,10-decane-dicarboxylic acid), methyl-malonic, dimethyl-malonic, diethyl-malonic, α-methyl-succinic, α,α'-dimethyl-succinic, tetramethyl-succinic, β,β-dimethyl glutaric, α,α,α',α'-tetramethyl adipic β,β,β',β'-tetramethyl adipic, etc.

The properties of films, fibers, or other molded objects which constitute a preferred embodiment of this invention vary greatly depending in a large measure upon the identity of the glycol utilized to form the interpolyester. Thus melting points, degree of crystallinity, rate of crystallizing, etc. will vary considerably. Accordingly, although the use of bibenzoic acid in a quantity in the range of 75 to 95 weight percent is generally satisfactory, a range of 75 to 85 weight percent is generally preferred where formation of films or fibers is contemplated.

The catalytic condensing agents or ester-interchange catalyst which may be employed are conventional ones and include, for example, the alkali metals, the alkaline earth metals; the oxides, carbonates, and borates of these two groups of metals, the one to six carbon alkoxides of these two groups of metals; magnesium, zinc, and manganese; the oxides of these metals; zinc borate; the sulfates, phosphates and acetates of zinc, cadmium, magnesium aluminum and copper; litharge or a combination of litharge with antimony trioxide and triphenyl phosphite as described in U.S. Patent No. 2,650,213; compounds of the formula:

$$M(Al(OR)_4)$$

wherein M is an alkali metal, e.g. lithium, sodium, or potassium, and R is an alkyl radical containing from 1 to 6 carbon atoms; R can be derived from a lower aliphatic alcohol such as methyl, ethyl, propyl, n-butyl, isobutyl, n-amyl, etc., as described in U.S. 2,720,506; a composition consisting of lithium hydride and a glycol-soluble organic salt of cadmium, magnesium, or zinc as described in U.S. Patent No. 2,681,360.

From about 0.005% to about 0.2% of such catalysts based on the weight of diester monomer being condensed may be employed. Higher or lower percentages may also be employed. Generally, from about 0.01% to about 0.05% of the catalytic condensing agent can be advantageously employed, based on the weight of dibasic acid diester being condensed. As will be apparent to those skilled in the art, it is generally advantageous from a cost standpoint to utilize the minimum quantity of one of the above catalysts which effect optimum results. Obviously, however, quantities larger or smaller than those outlined above will be employed by those skilled in the art where needed, e.g. to accelerate or decelerate rate of reaction, to modify properties—luster, molecular weight, tenacity, etc.

The reaction can be carried out in the presence or absence of a solvent, preferably the latter. Illustrative of such solvents are inert high boiling compounds, such as diphenyl ether, diphenyl, mixed tolyl sulfones, chlorinated naphthalene, chlorinated diphenyl, dimethyl sulfolane, etc.

It is essential to exclude oxygen and moisture at all stages of the condensation reaction. Otherwise discoloration, low molecular weight, and/or insolubilization of the polyester results. Inert atmospheres which can advantageously be employed include nitrogen, hydrogen, helium, etc. The exclusion of moisture is readily effected by employing substantially anhydrous reactants.

The interpolyesters of this invention can be formed into filaments or films by conventional melt extrusion procedures. For example, the interpolyesters can be melt extruded vertically at a melt temperature of approximately 25° C. above the melting point of the interpolyester followed by immediate quenching and orientating.

The following examples are not given by way of limitation, the scope of the invention being determined by the appended claims. In all of the following examples PbO is litharge.

*Example 1*

A polymerization vessel fitted with an exit tube, water cooled condenser and a water cooled receiver was charged with 14.32 grams diethyl bibenzoate, 5.57 grams diethyl succinate and 10.92 g. ethylene glycol. To this mixture were added 0.01 g. litharge and 0.01 g. cobaltous acetate as a mixed catalyst for ester interchange and a boiling chip to prevent bumping during subsequent heating. The polymerization vessel was evacuated and flushed with oxygen-free nitrogen 4 times prior to heating, then heated rapidly to 190° C. during which time the reactants melted with rapid evolution of ethanol. The initial ester interchange to produce the mixed glycol esters was carried out at 190° C. for 4 hours to assure complete conversion to the desired products resulting in thin mobile clear liquids which on cooling solidified to white opaque pasty solids. The vessel was gradually heated to 275° C. over a 1 hour period with distillation of ethylene glycol. The polymerization temperature was maintained at 275° C. while the pressure was gradually reduced over a 1 hour period to less than 1 mm. and polymerization continued under these conditions for an additional 4.5 hours. The polymer thus produced was a viscous light brown colored liquid which crystallized to a light brown opaque hard solid on cooling. The polymer had a birefringent melting point of 261° C. and formed fibers and transparent flexible films which were quite strong and tough after orientation.

*Example 2*

A polymerization vessel fitted with an exit tube, water cooled condenser and a water cooled receiver was charged with 16.71 grams diethyl bibenzoate, 6.20 grams diethyl sebacate and 10.92 g. ethylene glycol. To this mixture were added 0.01 g. PbO and 0.01 g. cobaltous acetate as a mixed catalyst for ester interchange and a boiling chip to prevent bumping during subsequent heating. The polymerization vessel was evacuated and flushed with oxygen-free nitrogen 4 times prior to heating, then heated rapidly to 175° C. during which time the reactants melted with rapid evolution of ethanol. The initial ester interchange to produce the mixed glycol esters was carried out at 175° C. for 4 hours to assure complete conversion to the desired products resulting in thin mobile clear liquids which on cooling solidified to white opaque solids. The vessel was gradually heated to 275° C. over a 1 hour period with distillation of ethylene glycol. The polymerization temperature was maintained at 275° C. while the pressure was gradually reduced over a 1 hour period to less than 1 mm. and polymerization continued under these conditions for an additional 5 hours. The polymer thus produced was a buff opaque solid on cooling. The polymer had a birefringent melting point of 276° C. and formed fibers and transparent flexible films which were quite strong and tough after orientation.

*Example 3*

A polymerization vessel fitted with an exit tube, water cooled condenser and a water cooled receiver was charged with 19.09 grams diethyl bibenzoate, 4.13 grams diethyl sebacate and 10.92 g. ethylene glycol. To this mixture were added 0.01 g. PbO and 0.01 g. cobaltous acetate as a mixed catalyst for ester interchange and a boiling chip to prevent bumping during subsequent heating. The polymerization vessel was evacuated and flushed with oxygen-free nitrogen 4 times prior to heating, then heated rapidly to 175° C. during which time the reactants melted with rapid evolution of ethanol. The initial ester interchange to produce the mixed glycol esters was carried out at 175° C. for 4 hours to assure complete conversion to the desired products resulting in thin mobile clear liquids which on cooling solidified to white opaque solids. The vessel was gradually heated to 275° C. over a 1 hour period with distillation of ethylene glycol. The polymerization temperature was maintained at 275° C. while the pressure was gradually reduced over a 1 hour period to less than 1 mm. and polymerization continued at 300° C. for an additional 4 hours. The polymer thus produced was a light tan opaque solid having a birefringent melting point of 313° C.

*Example 4*

A polymerization vessel fitted with an exit tube, water cooled condenser and a water cooled receiver was charged with 14.32 grams diethyl bibenzoate, 3.10 grams diethyl sebacate and 13.75 g. neopentylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 180° C. during which time the reactants melted with rapid evolution of ethanol. The initial ester interchange to produce the mixed glycol esters was carried out at 180° C. for 4 hours to assure complete conversion to the desired products resulting in thin mobile clear liquids which on cooling solidified to white opaque solids. The vessel was gradually heated to 260° C. over a 1 hour period with distillation of neopentylene glycol. The polymerization temperature was maintained at 260° C. while the pressure was gradually reduced over a 1 hour period to less than 1 mm. and polymerization continued under these conditions for an additional 5 hours. The polymer thus produced was a viscous light straw colored liquid which crystallized to a light straw translucent solid on cooling. The polymer had a birefringent melting point of 122° C. and formed fibers and transparent flexible films which would cold-draw.

*Example 5*

A polymerization vessel fitted with an exit tube, water cooled condenser and a water cooled receiver was charged with 14.32 grams diethyl bibenzoate, 2.09 grams diethyl succinate and 13.75 g. neopentylene glycol. To this mixture were added 0.01 g. zinc acetate, 0.019 manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 180° C. during which time the reactants melted with rapid evolution of ethanol. The initial ester interchange produce the mixed glycol esters was carried out at 180° C. for 4 hours to assure complete conversion to the desired products resulting in thin mobile clear liquids which on cooling solidified to white opaque pasty solids. The vessel was gradually heated to 260° C. over a 1 hour period with distillation of neopentylene glycol. The polymerization temperature was maintained at 260° C. while the pressure was gradually reduced over a 1 hour period to less than 1 mm. and polymerization continued under these conditions for an additional 6 hours. The polymer thus produced was a viscous amber colored liquid which crystallized to an amber translucent solid on cooling, having a softening point of 160° C.

*Example 6*

A polymerization vessel fitted with an exit tube, water cooled condenser and a water cooled receiver was charged with 11.19 grams diethyl bibenzoate, 2.18 grams diethyl methyl malonate and 6.83 g. ethylene glycol. To this mixture were added 0.01 g. PbO and 0.01 g. cobaltous acetate as a mixed catalyst for ester interchange and a boiling chip to prevent bumping during subsequent heating. The polymerization vessel was evacuated and flushed with oxygen-free nitrogen 4 times prior to heating, then heated rapidly to 190° C. during which time the reactants melted with rapid evolution of ethanol. The initial ester interchange to produce the mixed glycol esters was carried out at 190° C. for 4 hours to assure complete conversion to the desired products resulting in thin mobile clear liquids which on cooling solidified to white opaque solids. The vessel was gradually heated to 275° C. over a 1 hour period with distillation of ethylene glycol. The polymerization temperature was maintained at 275° C. while the pressure was gradually reduced over a 1 hour period to less than 1 mm. and polymerization continued under these conditions for an additional 4 hours. The polymer thus produced was a tan colored liquid which crystallized to a light tan opaque hard solid on cooling, having a melting point of 322° C.

*Example 7*

A polymerization vessel fitted with an exit tube, water cooled condenser and a water cooled receiver was charged with 14.32 grams diethyl bibenzoate, 2.09 grams diethyl succinate and 23.0 g. decamethylene glycol. To this mixture were added 0.01 g. zinc acetate, 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 4 times prior to heating, then heated rapidly to 180° C. during which time the reactants melted with rapid evolution of ethanol. The initial ester interchange to produce the mixed glycol esters was carried out at 180° C. for 5 hours to assure complete conversion to the desired products resulting in thin mobile clear liquids which on cooling solidified to white opaque solids. The vessel was gradually heated to 260° C. over a 1 hour period. The polymerization temperature was maintained at 260° C. while the pressure was gradually reduced over a 1 hour period to less than 1 mm. and polymerization continued under these conditions for an additional 6 hours. The polymer thus produced was a light tan colored liquid which crystallized to a cream opaque wax-like solid on cooling. The polymer had a birefringent melting point of 154° C.

*Example 8*

A polymerization vessel fitted with an exit tube, water cooled condenser and a water cooled receiver was charged with 19.09 grams diethyl bibenzoate, 2.79 grams diethyl succinate and 10.92 g. ethylene glycol. To this mixture were added 0.01 g. litharge and 0.01 g. cobaltous acetate as a mixed catalyst for ester interchange and a boiling chip to prevent bumping during subsequent heating. The polymerization vessel was evacuated and flushed with oxygen-free nitrogen 3 times prior to heating, then heated rapidly to 190° C. during which time the reactants melted with rapid evolution of ethanol. The initial ester interchange to produce the mixed glycol esters was carried out at 190° C. for 4 hours to assure complete conversion to the desired products resulting in thin mobile clear liquids which on cooling solidified to white opaque pasty solids. The vessel was gradually heated to 275° C. over a 1 hour period with distillation of ethylene glycol. The polymerization temperature was maintained at 275° C. while the pressure was gradually reduced over a 1 hour period to less than 1 mm. and polymerization continued at 310° C. for an additional 5 hours. The polymer thus produced was a brown opaque solid on cooling. The polymer had a birefringent melting point of 345° C.

*Example 9*

A polymerization vessel fitted with an exit tube, water cooled condenser and a water cooled receiver was charged with 16.71 grams diethyl bibenzoate, 4.18 grams diethyl succinate and 10.92 g. ethylene glycol. To this mixture was added 0.01 g. litharge and 0.01 g. cobaltous acetate as a mixed catalyst for ester interchange and a boiling chip to prevent bumping during subsequent heating. The polymerization vessel was evacuated and flushed with oxygen-free nitrogen 3 times prior to heating, then heated rapidly to 190° C. during which time the reactants melted with rapid evolution of ethanol. The initial ester interchange to produce the mixed glycol esters was carried out at 190° C. for 4 hours to assure complete conversion to the desired products resulting in thin mobile clear liquids which on cooling solidified to white opaque pasty solids. The vessel was gradually heated to 275° C. over a 1 hour period with distillation of ethylene glycol. The polymerization temperature was maintained at 275° C. while the pressure was gradually reduced over a 1 hour period to less than 1 mm. and polymerization continued at 300° C. for an additional 4 hours. The polymer thus produced was a brown opaque brittle solid on cooling. The polymer had a birefringent melting point of 313° C.

*Example 10*

A polymerization vessel fitted with an exit tube, water cooled condenser and a water cooled receiver was charged with 16.71 grams diethyl bibenzoate, 5.53 grams diethyl suberate and 10.92 g. ethylene glycol. To this mixture were added 0.01 g. PbO and 0.01 g. cobaltous acetate as a mixed catalyst for ester interchange and a boiling chip to prevent bumping during subsequent heating. The polymerization vessel was evacuated and flushed with oxygen-free nitrogen 3 times prior to heating, then heated rapidly to 190° C. during which time the reactants melted with rapid evolution of ethanol. The initial ester interchange to produce the mixed glycol esters was carried out at 190° C. for 4 hours to assure complete conversion to the desired products resulting in thin mobile clear liquids which on cooling solidified to white opaque pasty solids. The vessel was gradually heated to 275° C. over a 1 hour period with distillation of ethylene glycol. The polymerization temperature was maintained at 275° C. while the pressure was gradually reduced over a 1 hour period to less than 1 mm. and polymerization continued under these conditions for an additional 4 hours. The polymer thus produced was a viscous buff colored liquid which crystallized to a buff opaque solid on cooling and formed fibers and transparent flexible films which were quite strong and tough after orientation.

We claim:

1. A filament and film forming linear interpolyester melting above 140° C. of components consisting essentially of a mixture of dicarboxylic acids and at least 2 mols per mol of mixed acids of a glycol having the general formula

HO—R—OH wherein R is a bivalent aliphatic hydrocarbon radical containing 2 to 20 carbon atoms, said mixture of dicarboxylic acids consisting essentially of from 75 to 95 mol percent of p,p-bibenzoic acid and from 25 to 5 mol percent of an aliphatic dicarboxylic acid having the general formula

HOOC—R'—COOH wherein R' is a bivalent saturated aliphatic hydrocarbon radical containing 1 to 12 carbon atoms.

2. The filament and film forming linear interpolyester of claim 1 wherein the mixture of acids consists essentially of from 75 to 85 mol percent of p,p'-bibenzoic acid and from 25 to 15 mol percent of an aliphatic dicarboxylic acid having the formula

HOOC—R'—COOH wherein R' is a bivalent saturated aliphatic hydrocarbon radical containing 1 to 12 carbon atoms.

3. The process of preparing filament and film forming linear interpolyesters melting above 140° C. which comprises reacting components consisting essentially of a mixture of lower alkyl diesters of dicarboxylic acids and at least two mols per mol of mixed diesters of a glycol having the general formula

HO—R—OH wherein R is a bivalent aliphatic hydrocarbon radical containing 2 to 20 carbon atoms, said mixture of diesters of dicarboxylic acids consisting essentially of from 75 to 95 mol percent of a diester of p,p'-bibenzoic acid and from 25 to 5 mol percent of a diester of an aliphatic dicarboxylic acid having the general formula

HOOC—R'—COOH wherein R' is a bivalent saturated aliphatic hydrocarbon radical containing 1 to 12 carbon atoms; said reaction taking place at a temperature above 150° C. in the presence of an ester interchange catalyst and in the absence of oxygen and moisture.

4. Process of claim 3 wherein the initial reaction temperature is kept from 150 to 225° C. until no further alcohol is liberated and thereafter the temperature is raised to from 200 to 400° C. with a gradual reduction of reaction pressure to less than 5 mm. of mercury.

5. The process of claim 4 wherein the initial temperature ranges from 175 to 200° C., the temperature is raised to from 260 to 290° C. and the pressure is reduced to from 0.2 to 0.5 mm. of mercury.

References Cited in the file of this patent
UNITED STATES PATENTS

| | | |
|---|---|---|
| 2,437,046 | Rothrock et al. | Mar. 2, 1948 |
| 2,623,033 | Snyder | Dec. 23, 1952 |
| 2,721,854 | Kohl | Oct. 25, 1955 |
| 2,727,881 | Caldwell et al. | Dec. 20, 1955 |

OTHER REFERENCES

Page 331, Bennett, Concise Chemical and Technical Dictionary, published 1947, Chemical Publishing Co., Inc., Brooklyn, N.Y.